United States Patent Office 2,930,674
Patented Mar. 29, 1960

2,930,674

PREPARATION OF MAGNESIUM BOROHYDRIDE

Theodore L. Heying, Grand Island, N.Y., assignor to Olin Mathieson Chemical Corporation, a corporation of Virginia No Drawing. Application November 15, 1957
Serial No. 696,882

2 Claims. (Cl. 23—14)

This invention relates to a method for the preparation of magnesium borohydride. More particularly, it relates to the formation of magnesium borohydride by the reaction of magnesium hydride with diborane.

The alkaline earth metal borohydrides, such as magnesium borohydride, are well known and are very useful compounds. They are active reducing agents, and are an advantageous source of diborane. They have been produced in a variety of ways, but all of these are subject to one or more defects. It has been proposed to prepare magnesium borohydride by the reaction of diethylmagnesium with diborane in the presence of benzene. This reaction, however, requires excess diborane to avoid the formation of magnesium hydride. Magnesium borohydride has been prepared by Wiberg and Bauer (Z. Naturforschg., 5b 397 (1950)) by the reaction in diethyl ether solution of a magnesium dialkyl and diborane at room temperature according to the following equation:

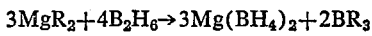
$$3MgR_2 + 4B_2H_6 \rightarrow 3Mg(BH_4)_2 + 2BR_3$$

The presence of the diethyl ether solvent appears to be necessary if good yields are to be obtained in the reaction. The use of diethyl ether as the solvent for this reaction, however, prohibits a large scale economical and safe method of making magnesium borohydride.

In accordance with the present invention, it has been discovered that magnesium borohydride can be prepared in good yield by reacting magnesium hydride and diborane while the magnesium hydride is in admixture with tetrahydrofuran or a mixture of tetrahydrofuran and up to 50% by volume of a lower dialkyl ether of ethylene glycol, a lower dialkyl ether of a polyethylene glycol, or a mixture of these dialkyl ether materials. The reaction between the magnesium hydride and the diborane while the magnesium hydride is in admixture with the tetrahydrofuran appears to proceed according to the following equation:

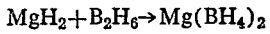
$$MgH_2 + B_2H_6 \rightarrow Mg(BH_4)_2$$

The dialkyl ethers which can be admixed with tetrahydrofuran to provide a reaction medium in accordance with the present invention are those of the class $RO(CH_2CH_2O)_nR'$ wherein R and R' are alkyl radicals containing from 1 to 4 carbon atoms and $n$ is an integer from 1 to 4. Among the suitable dialkyl ethers which can be used are ethylene glycol diethyl ether, ethylene glycol dimethyl ether, ethylene glycol di-n-butyl ether, diethylene glycol dimethyl ether, diethylene glycol diethyl ether, triethylene glycol dimethyl ether, triethylene glycol di-n-butyl ether, tetraethylene glycol dimethyl ether, tetraethylene glycol diethyl ether and the like.

The reaction is generally conducted at a temperature within the range of 25° to 105° C., although somewhat higher and somewhat lower temperatures can also be utilized, if desired. In carrying out this reaction, the reaction medium will generally contain from about one to about 10 percent by weight of magnesium hydride, based upon the weight of the tetrahydrofuran.

The following examples illustrate this invention. In the examples the term "moles" signifies gram moles.

*Example I*

An experiment was conducted in a 250 ml. round bottom three-neck flask, fitted with a thermowell. The flask was attached to a gas inlet tube, which extended below the surface of the reaction medium, and a water cooled condenser which was connected to a high vacuum system through a trap cooled to −78° C. by immersion in a Dry Ice acetone mixture. A second outlet tube was directly connected to the high vacuum system. Agitation of the reactants was accomplished by a magnetic stirrer.

The reaction flask was evacuated and flushed with nitrogen before the addition of the reactants. The flask was charged with approximately 80 ml. of tetrahydrofuran and 0.0657 mole of magnesium hydride was added. The mixture was stirred and gradually warmed to approximately 60° C., during which time the apparatus was flushed with nitrogen. After the nitrogen flush was terminated, 0.0370 mole of diborane at the rate of 0.31 ml. per min. was added. During this addition the temperature was maintained at 61° to 66° C. After the diborane had been completely added, the nitrogen flush was resumed and the mixture was allowed to cool to room temperature. This mixture then was filtered in a nitrogen atmosphere through a sintered glass disc.

The residue remaining on the sintered disc was dried at approximately 80° C. while under a vacuum of approximately one to five ml. of mercury. The dried residue contained 0.014 mole of magnesium and 0.0388 mole of boron. This corresponds to 0.014 mole of magnesium borohydride for a 72.2 percent yield.

*Example II*

This example was conducted similarly to Example I, using as the reaction medium 90 cc. of a 2.5 to 1 by volume mixture of tetrahydrofuran and diethylene glycol dimethyl ether as the reaction medium. The magnesium hydride, 0.0305 mole, charged to the reactor, was admixed with the reaction medium. Diborane, 0.0467 mole, at the rate of 0.44 ml. per minute was passed into the stirred mixture while the temperature was maintained at 65° to 73° C. In this manner, an 89.5 percent yield of magnesium borohydride was obtained.

I claim:

1. A method for the preparation of magnesium borohydride which comprises reacting magnesium hydride and diborane at a temperature within the range of 25° to 105° C. while the reactants are admixed with a material selected from the class consisting of mixtures of tetrahydrofuran with at least one compound of the generic formula $RO(CH_2CH_2O)_nR'$, wherein R and R' are alkyl radicals containing from 1 to 4 carbon atoms and $n$ is an integer from 1 to 4 in which such compound represents 28.6% to 50% by volume of the mixture and recovering magnesium borohydride from the reaction mixture.

2. The method of claim 1 wherein the reactants are admixed in a mixture of tetrahydrofuran and diethylene glycol dimethyl ether, said mixture consisting of 2.5 volumes of tetrahydrofuran and one volume of diethylene glycol dimethyl ether.

References Cited in the file of this patent

UNITED STATES PATENTS

| | | |
|---|---|---|
| 2,545,633 | Schlesinger | Mar. 20, 1951 |
| 2,726,926 | Paul | Dec. 13, 1955 |

OTHER REFERENCES

Wiberg et al.: "Chem. Abstracts," vol. 49, column 14548, Nov. 10, 1955; article abstracted is by Wiberg et al. from "Z. Naturforsch.," vol. 106, pages 292–296 (1955).